United States Patent [19]

Ryan

[11] Patent Number: 5,135,399
[45] Date of Patent: Aug. 4, 1992

[54] DIAGNOSTIC AND PRESCRIPTIVE METHOD FOR DEVELOPING MOTIVATIONAL SKILLS

[76] Inventor: Michael P. Ryan, P.O. Box 681523, San Antonio, Bexar County, Tex. 78228

[21] Appl. No.: 586,493

[22] Filed: Sep. 21, 1990

[51] Int. Cl.$^5$ .............................................. G09B 19/00
[52] U.S. Cl. .................................................. 434/236
[58] Field of Search ............... 434/236, 238, 322, 258, 434/247

[56] References Cited

PUBLICATIONS

Special Resource Materials Catalog, 1979, (Modern Education Corporation) pp. 30 & 34.
Psychological and Physiological Apparatus and Supplies, 1930 (Stoelting), p. 181.
Science Research Associates, Inc., 1975, pp. 105–109.
Psychological Tests and Instruments 1974, (Stoelting) p. 7.
Communication Skill Builders, Inc. 1978, p. 14.
Incentives for Learning 1980, pp. 2–3.
Teaching Resources Catalog 1979, pp. 32, 33, 46.
IPAT Catalog 1900–1991, pp. 10, 20, 24, 30 and School Motivation Analysis Test by Krug et al.

*Primary Examiner*—Richard J. Apley
*Assistant Examiner*—Karen A. Richard
*Attorney, Agent, or Firm*—Donald R. Comuzzi

[57] ABSTRACT

A diagnostic test method and associated apparatus which assesses different categories of motivational skills in an individual in order to diagnose motivational deficiencies that limit a person's performance in a given setting. The motivational strengths and weakness of individuals or groups are summarized as a Motivational Skills Profile in order to select the appropriate treatment program or procedure. A teaching aid consisting of a visual representation associates each category of diagnosed skill deficiency with research areas in which treatments for remediating that deficiency can be found. This teaching aid also adds to the effectiveness and efficiency of any motivational training program by highlighting specific motivational skill goals and by providing feedback on current skill levels.

9 Claims, 8 Drawing Sheets

DIAGNOSTIC AND PRESCRIPTIVE METHOD FOR DEVELOPING MOTIVATIONAL SKILLS

BACKGROUND OF THE INVENTION

1. Field of the Invention

The present invention relates to methods for evaluating motivational skills in human test subjects. More particularly, it is a method and associated apparatus for diagnosing motivational skill deficiencies, for prescribing appropriate motivational training programs, and for enhancing the effects of those programs.

2. Background

The attainment of any human goal requires the successful completion of a variety of goal-related activities. The more effort and ability that an individual brings to these activities, the more likely they are to be successfully accomplished. If an individual fails to invest the necessary effort in goal-related activities, he or she can be described as having a deficiency in one or more motivational skills. Motivational skills are defined as those skills which enable an individual to increase the level of effort he or she brings to goal-related activities. Different kinds of motivational skills are required to solve the full range of motivational problems that an individual encounters in carrying out an activity. These motivational capabilities are appropriately described as skills because they represent human capabilities that can be developed through instruction and training. Because different motivational skill deficiencies will require different forms of instruction and training, it is important to determine which skill deficiencies are responsible for the lack of goal-related effort observed in a given individual.

It is common in the art to determine the disposition, traits, or characteristics of human test subjects by asking them to select appropriate responses to printed statements, as disclosed in U.S. Pat. No. 4,627,010 issued to Von Fellenberg. It is also common in the art to distinguish among several kinds of dispositions within a more general domain, as disclosed in U.S. Pat. No. 4,573,927 issued to Newman. Although there are some procedures available for determining the level of one motivational skill or another, there is no single instrument which assesses the full range of known motivational skills. The present invention is designed to be comprehensive by virtue of assessing six general categories of human motivational skills.

It is sometimes necessary in the art to use nonverbal means to depict a particular disposition to a human test subject, as disclosed in U.S. Pat. No. 4,573,927 issued to Newman. Such means are important for communicating the disposition clearly and for engaging the interest and attention of the human test subject. Such means are also important for simplifying the interpretation of an individual's responses. Some procedures designed for use with young children involve response choices which vary in magnitude so as to depict increasing amounts of a given disposition. However, no procedure involves response choices in which visual representations of a disposition vary so as to depict increasing amounts of that disposition. The present invention makes use of distinctive and theoretically-prescribed visual representations to indicate each category of motivational skill. Each representation is shown as progressively modified so to provide response choices that reflect different levels of proficiency in a particular category of motivational skill.

It is common in the art to evaluate a capability so as to be able to recommend subsequent instruction or training that would develop that specific capability. This kind of diagnostic evaluation is useful because it ensures that remediation efforts are effective and efficient. Means for diagnostic evaluation are disclosed in U.S. Pat. No. 4,650,426 issued to Brigance and in U.S. Pat. No. 4,175,339 issued to Jones. Procedures are not available for the evaluation of motivational skill because motivation is not usually understood as a capability that can be developed through instruction and training. Diagnostic procedures are not available because it has not been clearly recognized that there are distinguishable motivational skills, each requiring different forms of instruction and training. The present invention links each category of motivational skill to a particular body of scientific research so that appropriate techniques can be selected to develop that motivational capability.

It is common in the art to devise means for enhancing the effectiveness or the efficiency of efforts to modify human capabilities. A means for enhancing mental imaging capabilities is disclosed in U.S. Pat. No. 3,613,266 issued to Conway. A means for enhancing emotional capabilities is disclosed in U.S. Pat. No. 4,573,927 issued to Newman. Such means are particularly important in the development of motivational skills because individuals may not be able to focus clearly on the skill to be enhanced nor be able to recognize clearly when increased proficiency has been attained. In general, training efforts are more successful when instructional goals are clearly specified and when relevant feedback is clearly provided. The visual representations of each category of motivational skill available in the present invention make it possible to target specific motivational objectives and to provide informative feedback on the current level of each motivational skill.

The present invention affords a procedure for a comprehensive and diagnostic assessment of human motivational skills. Because it depicts those skills visually, the procedure is appealing to a wide range of individuals and is flexible enough to be adapted to the assessment of human motivation in any setting. The procedure can be used on an individual or group basis to diagnose motivational deficiencies, to prescribe training programs, to assist in the implementation of those programs, and to evaluate their effects.

OBJECTS OF THE PRESENT INVENTION

Accordingly, the principal object of the present invention is to diagnose motivational skill deficiencies in human test subjects.

Another object of the present invention is to communicate in a clear, meaningful, and involving way the true nature of each category of motivational skill.

A further object of the present invention is to afford a diagnostic procedure which is generally applicable to the assessment of motivational skills.

Still another object of the present invention is to prescribe research-based recommendations for remediating each kind of diagnosed skill deficiency.

Yet another object of the present invention is to facilitate motivational training programs by specifying their goals more clearly to participants and by providing more informative feedback to participants.

SUMMARY OF THE INVENTION

The method of the present invention assesses motivation by evaluating six categories of motivational skills identified by the inventor. These categories are: (1) feeling effective; (2) seeing value; (3) pushing hard; (4) having fun; (5) coping with failure; and (6) taking pride. The method requires, in addition, the identification of the significant activities in a setting that can profit from increased effort on the part of the assessed individual.

Information about the level of each kind of motivational skill is collected by carrying out the following steps:

(1) the individual is asked to recall a specific activity carried out in that setting;

(2) the individual is shown a visual representation of a particular category of skill and told how it reflects that skill;

(3) the individual is asked to judge his level of that skill for a given significant activity;

(4) the individual is shown a series of visual representations illustrating increasing levels of a particular skill;

(5) the individual is asked to select the picture in the series that reflects his level of skill for the given significant activity;

(6) the individual then judges his level of the current skill for each of the remaining significant activities in the same way; and (7) the individual then repeats Steps (2) through (6) for each of the remaining categories of motivational skill.

The selections made by each individual or group of individuals are then summarized mathematically as a profile of the relative level of each category of motivational skills. This summary can simply reflect the relative level of each category of skill or it can reflect the relative contribution each category of skill makes to a behavior of particular importance in the setting. These profiles enable important skill deficiencies to be identified for subsequent instruction and training.

The six categories of motivational skills have been chosen to correspond to particular areas of scientific research. For that reason, techniques for remediating any identified skill deficiency can be selected from existing psychological and educational research. The visual representations developed for each category of skill can be made available as slides or posters during training in order to focus training efforts. In addition, the representations in each skill series can be provided to individuals in different forms in order to provide them with information about the effectiveness of those training efforts.

The present invention offers a convenient and flexible tool for diagnosing motivational deficiencies and guiding motivational training programs. Given the general and comprehensive nature of the skill categories defined in this invention, it can be used in any human setting where the significant activities will profit from increased levels of effort.

DETAILED DESCRIPTION

The following is a description of one exemplary embodiment. In this embodiment, the tested individuals are fourth-grade children and the setting is an elementary school where learning motivation is to be assessed. There is a wide variety of modifications one skilled in the art could adapt to the embodiment disclosed hereinbelow and still remain within the breadth of this disclosure. All of these adaptations are encompassed within the spirit of the present invention. For one example, the present methods and materials can be easily modified for use in assessing other kinds of individuals in other kinds of educational settings. That is, it can be used to assess the learning motivation of individuals in middle-schools, in high-schools, in trade schools, in universities, in continuing education programs, and in on-the-job training programs. As another example, the present methods and materials can be easily modified for use in assessing an individual's motivation to pursue any other kind of human goal. That is, it can be used to assess one's motivation to pursue occupational goals, recreational goals, religious goals, athletic goals, physical goals, interpersonal goals, or personal goals. In other words, it will be appreciated by one skilled in the art that this invention is not limited to elementary-school children or to educational motivation.

According to the present invention, an individual's motivation to pursue a given goal can be enhanced by helping him or her develop motivational skills in six categories. These skills have been derived by the inventor from contemporary psychological research. Each skill is symbolized by a different visual representation developed by the inventor. Increasing levels of a given skill are portrayed as progressive changes in a salient feature of the visual representation associated with that skill. The use of visual representations makes it possible to tailor the procedure to different kinds of individuals by modifying the instructions that accompany the presentation of the representations.

Figure 1:
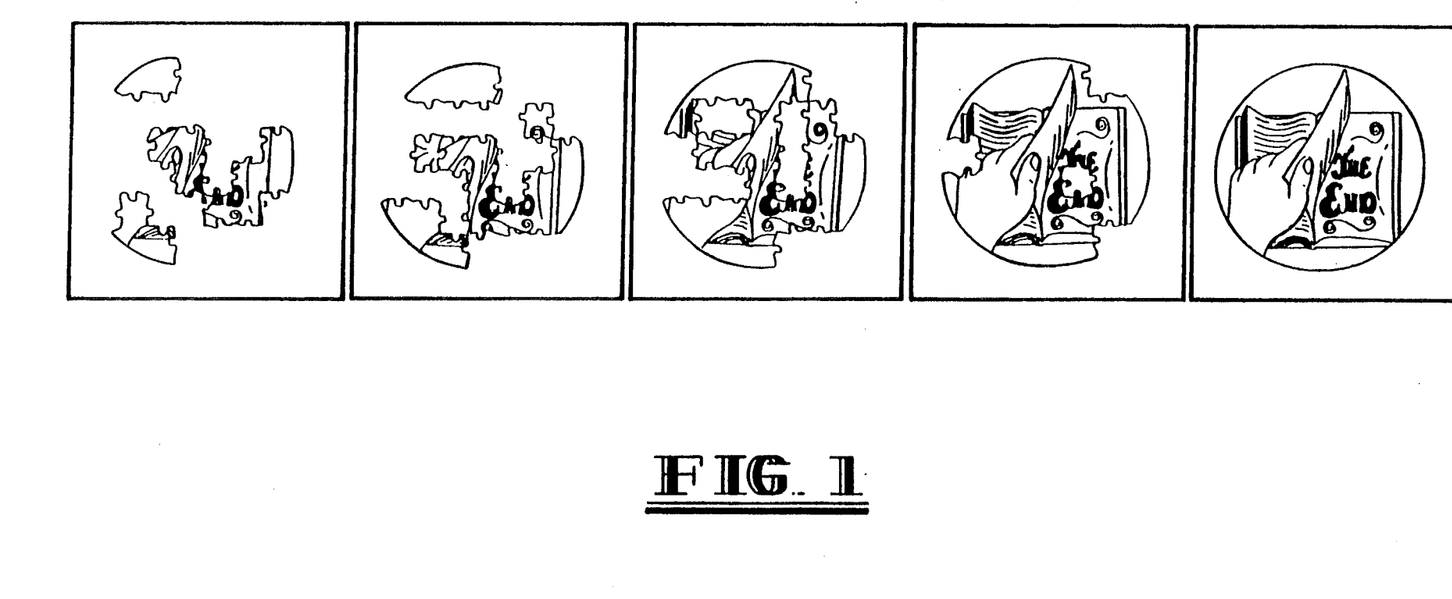
FIG. 1 shows a series of visual representations illustrating increasing levels of "feeling effective" as an increasingly more complete jigsaw puzzle.

The following definitions distinguish the different contribution made by each category of skill to the efforts one makes to pursue a given goal. In each case, specific behavioral criteria are described that provide the basis for evaluating the extent of each skill in a given individual:

One category of motivational skill enables an individual to define the requirements of a particular activity, to anticipate the extent to which he can meet those demands, and to monitor the degree to which those demands are satisfied by his efforts. These behaviors are summarized in words as "feeling effective" and in visual form as a completed jigsaw puzzle, FIG. 1.

Figure 2:
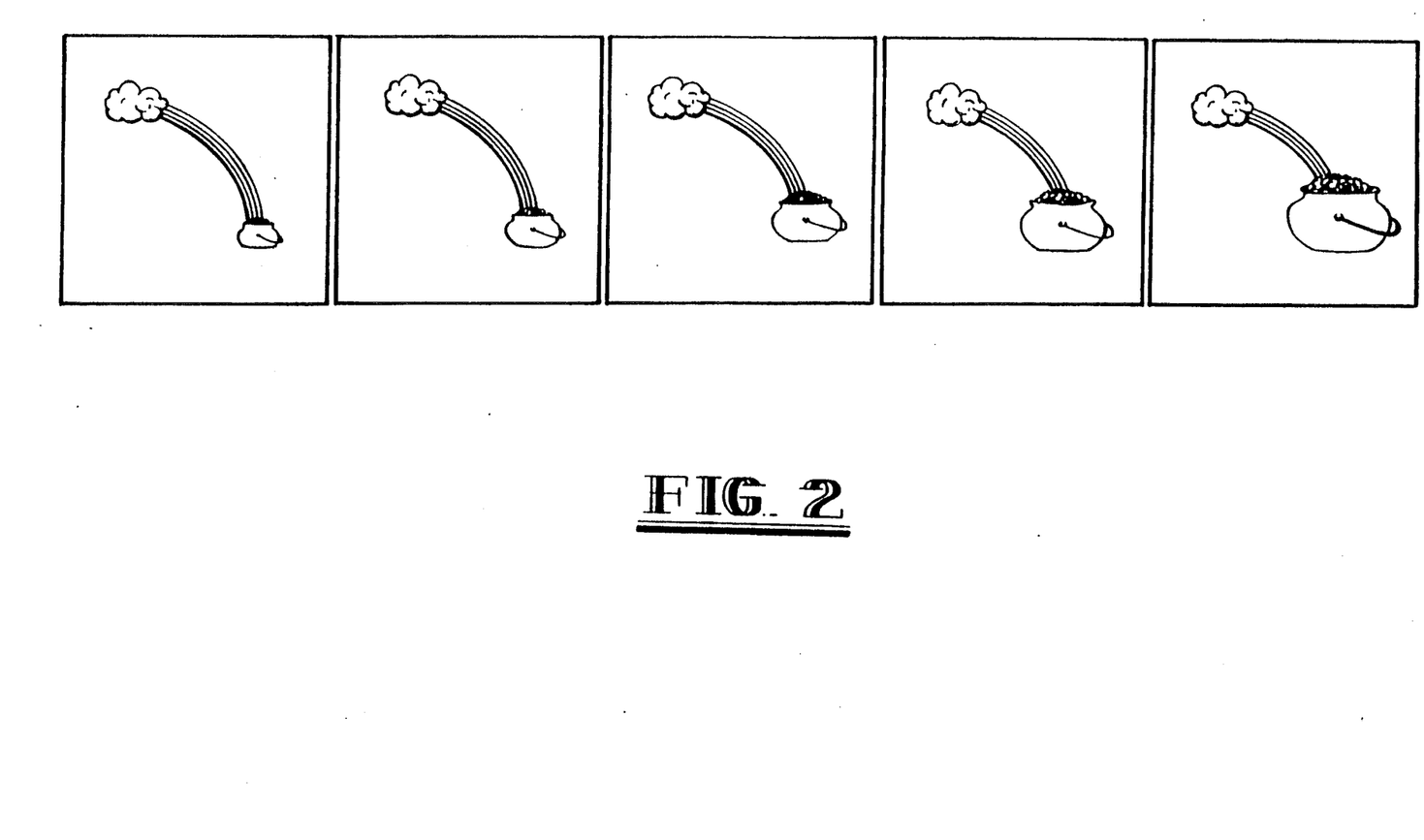
FIG. 2 shows a series of visual representations illustrating increasing levels of "seeing value" as an increasingly larger pot of gold at the end of a rainbow.

A second category of motivational skill enables an individual to specify his personal goals and values, to inventory the likely outcomes of successful activity completion, and to evaluate the degree to which those outcomes realize any of those goals or values. These behaviors are summarized in words as "perceiving value" and in visual form as a large pot of gold, FIG. 2).

Figure 3:
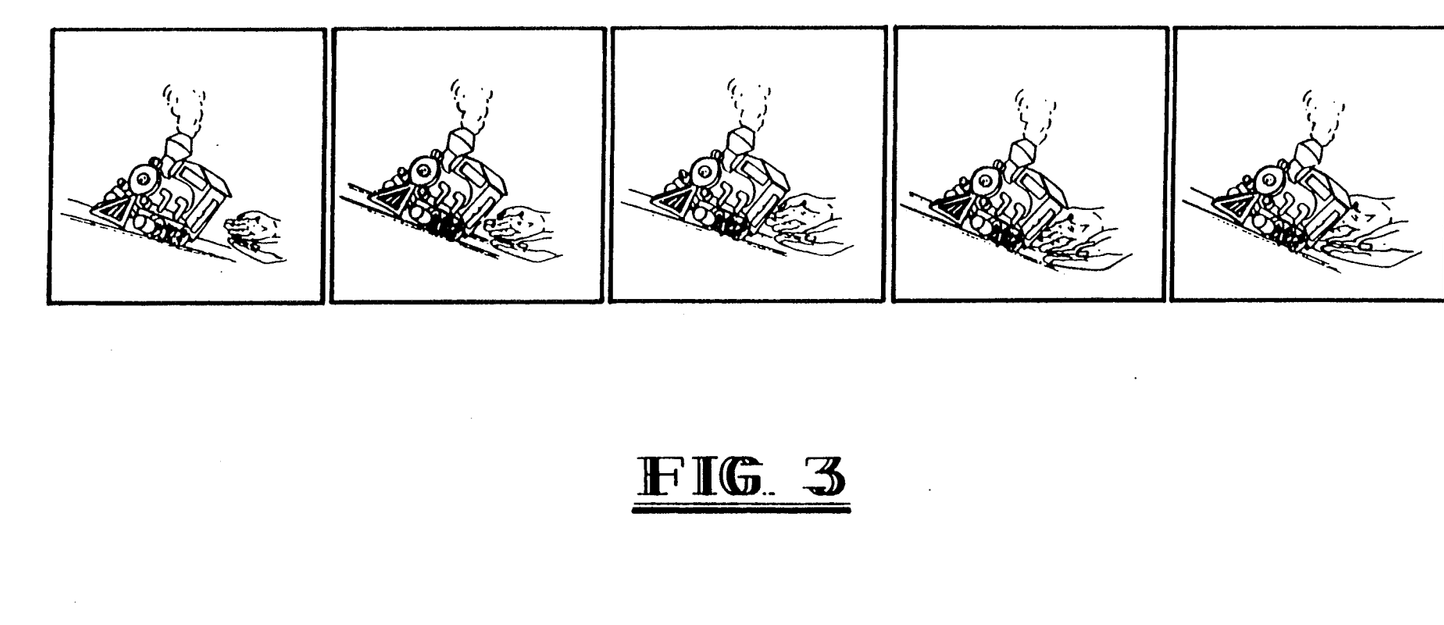
FIG. 3 shows a series of visual representations illustrating increasing levels of "pushing hard" as an increasingly larger pair of hands pushing a train up a hill.

A third category of motivational skill enables an individual to predict the efforts demanded by a given activity, to discover effective means for sustaining those efforts, and to implement those means as his efforts begin to falter. These behaviors are summarized in words as "pushing hard" and in visual form as a large pair of hands pushing a train up a hill, FIG. 3.

Figure 4:
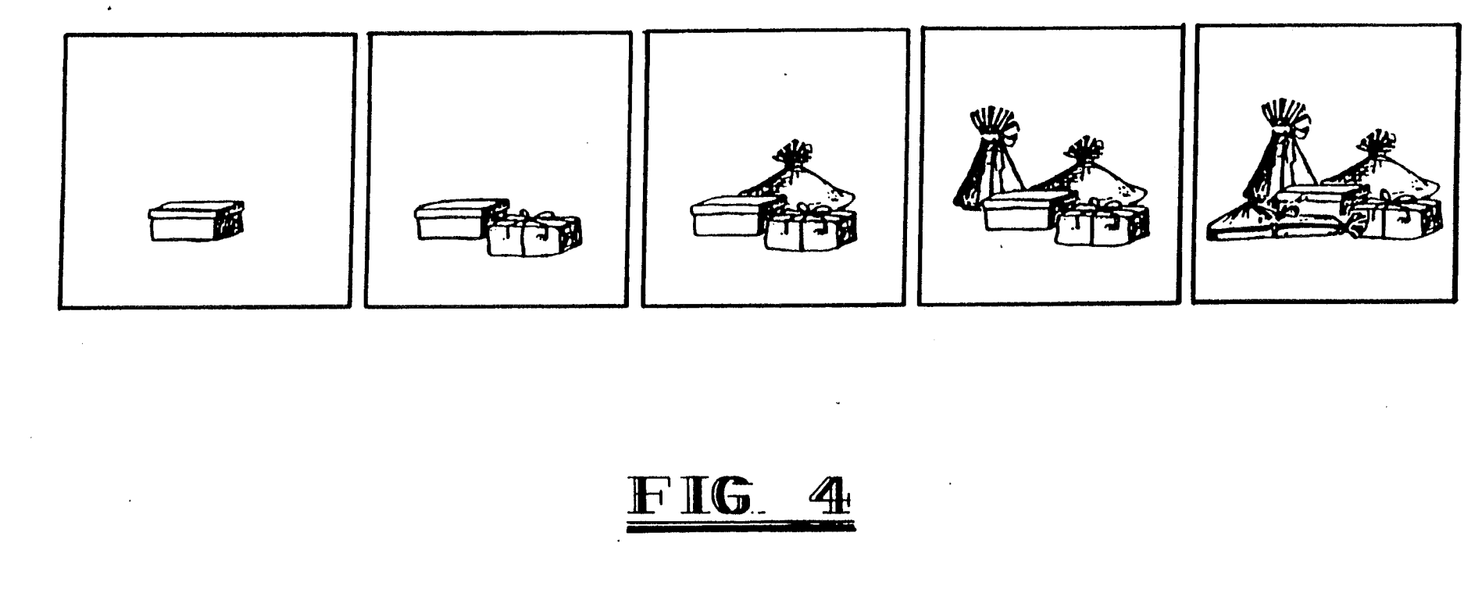
FIG. 4 shows a series of visual representations illustrating increasing levels of "having fun" as an increasingly large and more varied stack of wrapped presents.

A fourth category of motivational skill enables an individual to recognize those features of an activity that are intrinsic to its performance, to discern those features in a given task, and to take pleasure in those features of the task. These behaviors are summarized in words as "having fun" and in visual form as a large and diverse stack of wrapped presents, FIG. 4.

Figure 5:
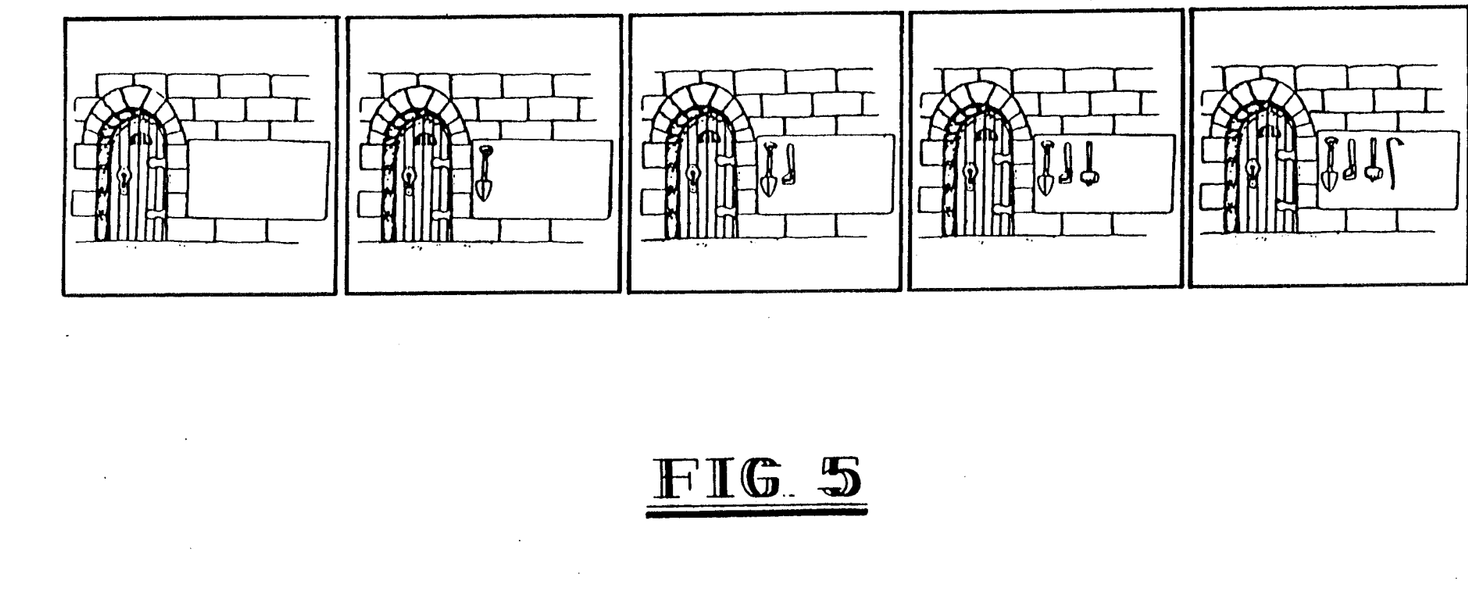
FIG. 5 shows a series of visual representations illustrating increasing levels of "coping with failure" as an increasingly large and more varied set of tools for opening a locked door.

A fifth category of motivational skill enables an individual to determine the basis for any deficiencies in the way an activity has been performed, to devise alternative ways of carrying out the activity, and to evaluate the cost effectiveness of additional or different activity efforts. These behaviors are summarized in words as "coping with failure" and in visual form as a large and diverse set of tools to use in opening a locked door FIG. 5.

Figure 6:
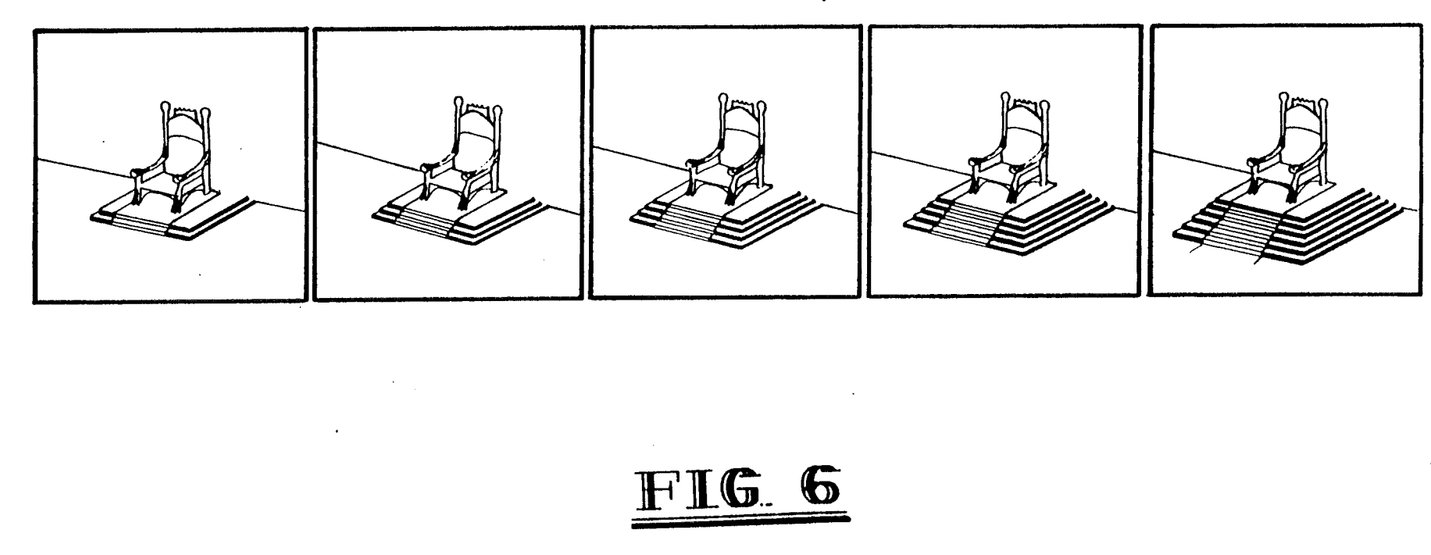
FIG. 6 shows a series of visual representations illustrating increasing levels of "taking pride" as an increasingly more elevated throne.

A sixth category of motivational skill enables an individual to acknowledge the successful completion of an activity, to identify his contribution to that outcome, and to take satisfaction in the personal growth evidenced by that accomplishment. These behaviors are summarized in words as "taking pride" and in visual form as a throne elevated by several platforms, FIG. 6.

According to the present invention, a measure of each motivational skill is obtained by asking an individual to select the representation in each series which best reflects the skill that he possesses with respect to each activity in a defined set of goal-related activities. These activities are defined so as to represent the significant goal-related activities in a given setting. For elementary-school children, the activities relevant for assessing school motivation might correspond to particular subject-matter areas. For employees in an organization, the activities relevant for assessing work motivation might reflect different job responsibilities. Because all that distinguishes one motivational goal from another in this invention are the activities in which effort is to be invested, the procedure can be easily tailored to different settings by modifying the set of goal-related activities defined for the individual.

Figure 7:
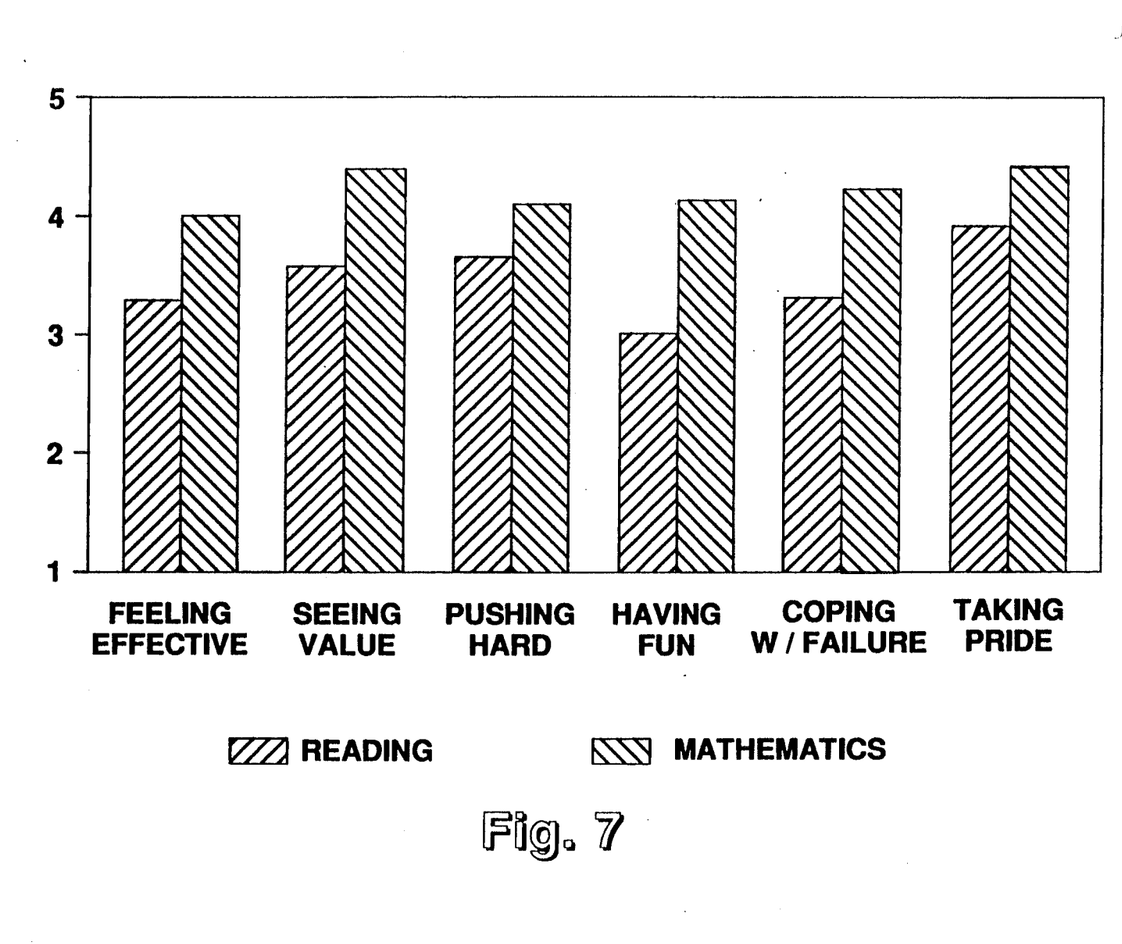
FIG. 7 shows a Motivational Skills Profile illustrating the relative levels of skill reported by fourth-graders for the significant school activities of reading and mathematics.

According to the present invention, the selections made by individuals for each skill and goal-related activity are summarized mathematically as a Motivational Skills Profile, FIG. 7. This Profile shows the relative level of each of the six motivational skills reported by the fourth-graders for the two activities of reading and mathematics. In this case, the classroom activity of reading is associated with lower levels of motivational skill than is mathematics. The Profile can also be used then to distinguish motivational skills which are less developed from those which are more developed. On this basis, those less developed skills can be targeted for instruction and training. This group of fourth-graders, for example, reports especially low levels of "feeling effective" and "having fun" in reading. Each motivational skill is linked to a distinct body of psychological research so that appropriate treatments can be designed for each kind of motivational skill deficiency.

According to the present invention, the treatment of motivational skill deficiencies can be facilitated in two ways by making use of the visual representations associated with each skill (see FIGS. 1, 2, 3, 4, 5, and 6). First, the final illustration in each series can be made available throughout the treatment sequence (e.g., with wall posters) so as to maintain the individual's focus on the skill he is to develop. This practice increases the effectiveness of the motivational treatment by ensuring that the purpose of the treatment is clear to the individual. Second, the various illustrations in a series can be employed to provide feedback to an individual about the extent to which his skill level is increasing (e.g., with stickers for children). This practice increases the efficiency of the motivational treatment by ensuring that increased proficiency in a targeted motivational skill is acknowledged and rewarded.

AN APPLICATION TO ASSESSING SCHOOL MOTIVATION

One purpose of the present invention is to provide a means for the diagnosis of motivational skill deficiencies. A second purpose is to provide a means for improving the effectiveness and efficiency of any treatment program is offered to remediate those deficiencies. The invention will now be described with respect to the evaluation and improvement of school motivation in elementary school children.

THE DIAGNOSTIC MEANS

The significant goal-related activities defined for the diagnosis of motivational skill deficiencies for this application were the school subjects of reading, writing, mathematics, social studies, and science. Although school subjects might normally be defined as the significant activities in a school setting, the procedure could have been carried out with a narrower or broader set of activities. A narrower focus on mathematics activities, for example, might have resulted in the definition of addition, subtraction, fractions, etc. as the significant activities in an elementary-school mathematics setting. A broader focus on life activities, for example, might have resulted instead in the definition of family activities, peer activities, school activities, etc., as the significant activities. The particular set of activities defined for any application depends only on the nature of the assessment problem. The invention, therefore, can be tailored to any desired level of focus as well as to any kind of individual and to any kind of goal-related effort.

In this application, each child was asked to rate his level of each motivational skill for each subject in individual sessions conducted by trained interviewers. The assessment has been carried out in group sessions and could also be carried out by means of a computer program or a self-instructional booklet.

The first step in the assessment procedure is to cause the individual to contemplate each of the significant activities to be performed in the setting. In the present example, each child was asked to write down the different activities he carried out when working on reading, writing, mathematics, social studies, and science. When necessary, children were prompted with descriptions of classroom activities provided by the teacher. This step helps to ensure that the child understands what activities are referred to by each subject-area label and that he has those activities clearly in mind as he reflects on his level of motivational skill. In other applications, more detailed activity inventories might be required of a tested individual or he might be asked to consider a detailed list of relevant activities.

The second step in the procedure is to cause the individual to contemplate a visual representation of one category of motivational skill. For example, a child is shown the final representation in the "feeling effective" series (FIG. 1) and asked to pretend that getting a school assignment completely done on time is like putting all of the pieces of a jigsaw puzzle together. In other applications, the final representation might be presented with a slide projector or as an image on a computer terminal or described in words. In addition, as the application demanded, the meaning of the visual representation might be alternatively described to reflect different standards for "feeling effective" or a different representation might be used to reflect the particular category of motivational skill.

The third step in the procedure is to cause the individual to contemplate his level of the designated motivational skill in a single significant activity. In the present example, a child is now asked to think about how likely he is to get a mathematics assignment done correctly and on time. In other applications, the individual might be more specific details about the activity of interest or asked to recall specific activity episodes.

The fourth step in the procedure is to cause the individual to contemplate a series of visual representations illustrating increasing levels of the motivational skill. Here, the child is shown the complete "feeling effective" picture series (FIG. 1) and asked to pretend that each picture shows a greater feeling of being able to get the assignment completed on time than the previous picture in the series. In other applications, the series might be composed of a different number of pictures or a different feature of the visual representation might vary across the series. In still other applications, the series might be composed of numbers, letters, or words which stand in place of visual representations.

The fifth step in the procedure is to cause the individual to select the representation in the series that reflects his level of the motivational skill for the significant activity. In this example, the child is asked to place a sticker with the word "math" on it below the picture in the series that show how likely he is to get a mathematics assignment done correctly and on time. As the application required, an individual might use other means to make his selection (e.g., recording a number on a form or entering a number into a computer program).

The third, fourth, and fifth steps detailed above are then repeated for each of the remaining significant activities contemplated in the first step. For example, the child is now asked to select the representations in the "feeling effective" series that reflect how likely he is to get reading, writing, social studies, and science assignments done correctly and on time.

The procedure described above is then repeated in turn for each of the remaining categories of motivational skills. In other applications, the meaning of each series of visual representations might be alternatively described or a different representation might be used to reflect each category of motivational skill;

In the present example, the child is shown the final representation in the "seeing value" series (FIG. 2) and asked to pretend that feeling that a school subject is really important is like thinking that it will lead to a large pot of gold at the end of a rainbow. After making his "seeing value" selections for each significant activity, he is shown the final representation in the "pushing hard" series (FIG. 3) and asked to pretend that pushing yourself to keep working on a difficult school subject is like giving a train going up a steep hill a helpful push with a giant pair of invisible hands. When he has made his "pushing hard" selections, he is then shown the final representation in the "having fun" series (FIG. 4) and asked to pretend that feeling that working on a school subject is fun and exciting is like having a large pile of interesting-looking presents to unwrap. And after making his "having fun" selections, the child is shown the final representation in the "coping with failure" series (FIG. 5) and asked to pretend that having a lot of ideas about how to correct mistakes in a school subject is like having a lot of tools to use in getting a locked door open when you don't have a key. And lastly, after making his "coping with failure" selections, he is shown the final representation in the "taking pride" series (FIG. 6) and asked to pretend that being proud of yourself for improving your work in a school subject is like feeling that you deserve to sit on a very impressive throne.

One hundred and twenty-five fourth-graders were individually interviewed according to the foregoing procedure at an initial half-hour session and at a follow-up session a week later. Their selections for different categories of motivational skills and different school subjects were summarized mathematically as Motivational Skills Profiles. These Profiles can be used to describe the relative level of each category of motivational skill for the significant activities in a setting. For example, as is evident in FIG. 7, "feeling effective," "having fun," and "coping with failure" are less well developed in reading than in mathematics. Statistical procedures can be used to develop Profiles for different kinds of individuals within a given group. Although FIG. 7 displays a Motivational Profile for a large group of individuals, Profiles for individual schools, classes, and children could be developed as the application demanded.

Figure 8:
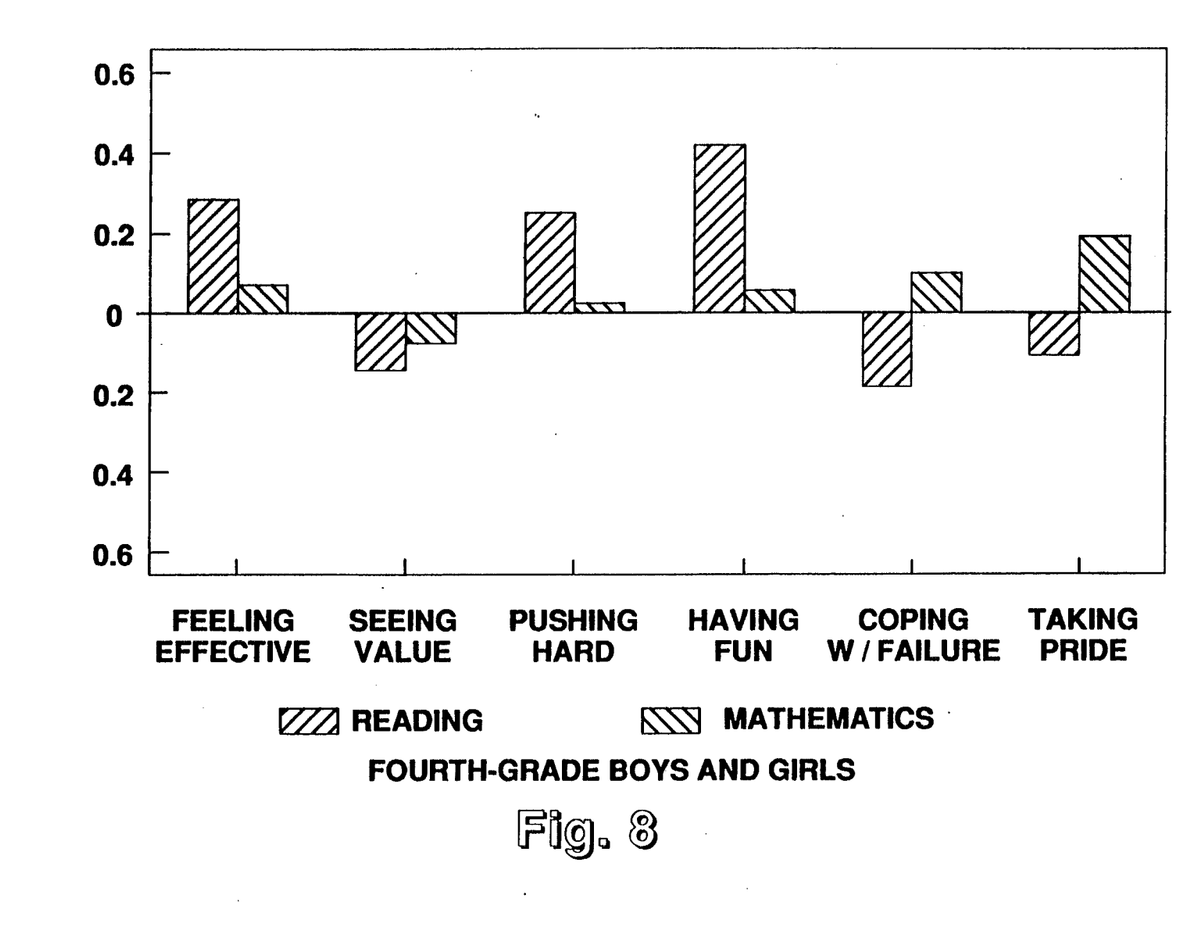
FIG. 8 shows a Motivational Skills Profile illustrating the relative contribution (as estimated by standardized regression coefficients) made by each category of skill to measures of self-esteem in reading and in mathematics.

In addition, statistical procedures can be used to create Motivational Skills Profiles that describe the relative contribution each category of motivational skill makes to some measure of interest. For example, an elementary school teacher may be concerned to develop the sense of well-being that her students have about their reading as an activity. The data collected according to the present invention were analyzed, therefore, to determine which motivational skills contributed most strongly to a measure of reading self-esteem available from a well standardized commercial instrument (Marsh, 1980). FIG. 8 shows that the motivational categories of "feeling effective," "having fun," and "pushing hard" contribute to a fourth-grader's sense of well-being about his performance on reading assignments. It is noteworthy that "coping with failure" does not contribute to a child's sense of reading self-esteem even though children report low levels of that skill with respect to reading. It is also noteworthy that only "taking pride" contributes significantly to mathematics self-esteem in this group. This kind of analysis makes use of Motivational Profile information to identify the categories of motivational skill which are most crucial for a developing a sense of well-being about a significant activity. However, the same kind of analysis can also be used to determine which skills contribute to classroom grades, standardized test scores, or school attendance.

THE TREATMENT MEANS

The second purpose of the present invention is provide a means for improving the effectiveness and efficiency of motivational skill training programs. The present invention serves that purpose in three ways.

First, each of the six categories of motivational skills described previously relates to a body of scientific research within which instruction and training techniques can be found for developing that category of skill. For example, the significant contribution that "feeling effective," "having fun, " and "pushing hard" make to reading self-esteem (see FIG. 9) indicates that a reading program that includes efforts to foster each of those skills would be more effective than one which does not. On this basis, one skilled in the art would examine existing sychological research on perceived self-efficacy, intrinsic motivation, and cognitive self-control, respectively, in order to identify useful and convenient techniques for developing each category of skill in a reading program. A research report authored by Bandura and Schunk (1901), for example, demonstrates that teaching elementary-school children to set very specific learning goals for themselves at each instructional session results in improved performance on a measure that reflect "feeling effective" and another that reflects "having fun." Another research report authored by Meichenbaum and Goodman (1971) demonstrates that teaching elementary-school children to use verbal self-control techniques results in improved performance on measures that reflect "pushing hard." In other applications, research findings can be sought that are relevant for individuals other than school children and for settings other than schools.

As can be seen, the present invention offers a means for selecting valid treatment techniques for remediating specific motivational skill deficiencies. This feature of the invention improves the efficiency of motivational skill training programs by prescribing instructional and training techniques that are specifically effective for remediating a given motivational skill deficiency. As the application demanded, a source book could be organized that would list teaching and instructional techniques according to the category of motivational skill they remediate. This source book could be incorporated into the assessment procedure so as to provide tailored treatment recommendations to accompany a Motivational Skills Profile. In other applications, motivational training might be seen as a natural and important part of any curriculum and offered as a matter of course rather than in order to correct deficiencies. In these applications, a source book would allow for techniques to be selected that would assure a balanced development of the full range of motivational skills.

Second, the present invention also offers a means for focusing an individual's learning efforts on a motivational skill that is to be developed or that needs to be utilized. The final representation in the "feeling effective" or "having fun" series (FIGS. 1 and 4) can be displayed in poster or slide form, for example, as children are receiving training and instruction in goal-setting strategies for their reading assignment. The availability of the representations would orient children as to the specific objectives of their motivational lesson and thereby increase its effectiveness. These representations could also be displayed as children are carrying out specific reading assignments in order to cue them to apply the motivational techniques they have learned. In other applications, the individual might be made to contemplate the final representation in a variety of ways.

Third, the present invention offers a means for informing an individual of his current skill level in each motivational category. The various representations in the "feeling effective" or "having fun" series can be used as stickers to provide information to a child about his level of skill prior to any motivational training. This practice would help the child to distinguish a particular category of motivational skill from other categories and facilitate subsequent instruction and training. For example, an elementary school teacher might observe children working on a particular reading assignment and provide each with a sticker from the "having fun" series (see FIG. 4). A child who had met more of a set of specified criteria for "having fun" while working on reading would receive a sticker showing a larger stack of presents than a child who had met fewer of those criteria. A feature of the present invention is that it defines each category of motivational skill with a specific set of behavioral criteria. For example, "having fun" would be reflected in a child's ability to recognize the unique features of reading as an activity, to discern those features in a given reading task, and to take pleasure in those feature of the activity. In any application, therefore, the present invention specifies the behavioral criteria that are to guide the evaluation of motivational skill.

During the course of a motivational training program, the behavioral criteria specified for each category of skill in the present invention can be used to evaluate and reward skill development. For example, as a child shows evidence of meeting more of the criteria for "having fun" while reading, he can be given a sticker or token which depicts a larger stack of presents in the "having fun" series. When the skill has been fully developed through training, its use can be maintained thereafter by rewarding the child each time he meets the criteria for "having fun" while reading. For example, he can be given as a reward a piece of a jigsaw puzzle that depicts the final visual representation in FIG. 4. In other applications, the visual representations of each category of skill might be used in different ways to evaluate and acknowledge skill development.

What is claimed is:

1. A diagnostic method for assessing motivational skills in preselected categories for a plurality of activities in a given setting utilizing a set of prompts each having a unique analogical relationship to a particular skill comprising the steps of:
    (b) providing the individual with a significant activity prompt;
    (a) providing the individual with a motivational skill prompt, said prompt consisting of an analogical representation and explanation of the analogy;
    (c) instructing the individual to contemplate his level of that motivational skill in said significant activity;

(d) providing the individual a series of prompts representing increasing analogical levels of that motivational skill;

(e) soliciting the individual to select the prompt in the series that best represents his level of skill for that activity;

(f) repeating steps (b) thru (e) for a plurality of activities within the setting;

(g) repeating steps (a) thru (f) for a plurality of motivational skills whereby a profile of the individual's motivational skill levels is obtained for each activity within the setting.

2. The method of claim 1 wherein the series of prompts comprise visual representations of different levels of the motivational skill.

3. The method of claim 2 wherein the visual representation comprise a strip series of pictures which portray successively greater skill levels of preselected categories of human motivational skills.

4. The method of claim 3 wherein the final representations in each series are designed to focus the individuals attention on a deficient skill in order to enhance the effectiveness of corrective treatment.

5. The method of claim 4 wherein selective representations in each series are designed to provide information to the individual regarding improvements in a motivational skill.

6. A diagnostic kit comprising a visual aid with instructions for use in assessing the level of a motivational skill in a pre-selected category for an individual in a given setting; said visual aid comprising a strip series of metaphorical representations, each having a unique analogical relationship to an identified skill, each successive representation portraying a change illustrating an increasing level of said identified skill; said instructions explaining the relationship between the motivational skill and the metaphorical representation.

7. A diagnostic method for assessing a plurality of motivational skills with respect to a plurality of activities within a given behavioral setting, which method utilizes a set of unique and theoretically meaningful metaphorical prompts for each category of motivational skill, comprising the steps of:

(a) providing the individual with a prompt for a selected motivational skill, said prompt consisting of a metaphorical representation and an explanation of the metaphor;

(b) providing the individual with a prompt for a designated activity within the chosen behavioral setting;

(c) providing the individual with a prompt specifying a period of time during which an opportunity existed for the selected motivational skill to be displayed with respect to the designated activity;

(d) providing the individual with a series of prompts representing increasing metaphorical levels of the selected motivational skill;

(e) instruct the individual to identify that prompt in the metaphorical series which best represents the level of the selected motivational skill displayed during the specified time period for the designed significant activity;

(f) repeating steps (b) through (e) for a plurality of designated activities within the chosen behavioral setting;

(g) repeating steps (a) through (f) for a plurality of selected motivational skills.

8. The diagnostic method of claim 7 wherein the prompts identified in each metaphorical series and relating to a single designated activity in the chosen behavioral setting are quantified as a motivational skills profile for that activity.

9. The method of claim 7 wherein each motivational skill represents an acquired capability for increasing the extent of one's efforts and includes at least two of the following categories of motivational skills:

(a) defining the requirements of a designated activity, anticipating the extent to which one can satisfy those requirements, the monitoring the degree to which the requirements are satisfied in order to "feel effective" about one's efforts on the designated activity;

(b) specifying one's personal goals in a given setting, listing the likely outcomes of the successful completion of a designated activity within that setting, and evaluating the degree to which these outcomes lead to those goals in order to "see value" in one's efforts on the designated activity;

(c) predicting the behaviors required to complete a designated activity in a given setting, discovering effective means for initiating and sustaining those behaviors, and implementing those means as necessary in order to "push hard" in one's efforts on the designated activity;

(d) recognizing the intrinsic features of a designated activity, discerning those features as one carries out that activity, and learning to take pleasure in those intrinsic features in order to "have fun" with one's efforts on the designated activity;

(e) determining the specific flaws in the way that a designated activity has been carried out, devising various procedures for correcting those flaws, and evaluating the likely costs and benefits of each corrective procedure in order to "cope with failure" on the designated activity;

(f) acknowledging an improvement in the performance of a designated activity, identifying the particular contributions that one's efforts and abilities have made to that improvement, and taking satisfaction in the observed improvement as evidence of one's growth and development in order to "take pride" in one's efforts on the designated activity.

* * * * *